United States Patent
Duarte

(10) Patent No.: US 6,463,181 B2
(45) Date of Patent: Oct. 8, 2002

(54) METHOD FOR OPTIMIZING VISUAL DISPLAY OF ENHANCED DIGITAL IMAGES

(75) Inventor: Michael J. Duarte, Fall River, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 61 days.

(21) Appl. No.: 09/749,493

(22) Filed: Dec. 22, 2000

(65) Prior Publication Data

US 2002/0114530 A1 Aug. 22, 2002

(51) Int. Cl.[7] .............................. G06T 5/00; G06T 5/10
(52) U.S. Cl. ...................... 382/254; 382/274; 382/276; 382/132
(58) Field of Search ............................. 382/274, 254, 382/276, 132

(56) References Cited

U.S. PATENT DOCUMENTS 5,717,791 A * 2/1998 Labaere et al. ............. 382/274
5,982,917 A   11/1999 Clarke

OTHER PUBLICATIONS

Chang et al, "Coherence of Multiscale Features for Enhancement of Digital Mammograms", IEEE Trans. on Information Technology in Biomedicine, vol. 3, No. 1, Mar. 1999, pp. 32–46.*

* cited by examiner

*Primary Examiner*—Scott Rogers
(74) *Attorney, Agent, or Firm*—Michael J. McGowan; Prithvi C. Lall; James M. Kasischke

(57) ABSTRACT

The present invention provides a method utilizing a wavelet transform for improving and optimizing the visual display of image data at the time of viewing to provide enhanced information analysis capability for image analysis such as breast cancer screening and diagnosis. Through the use of an interactive software tool, the user displays both unprocessed and processed images simultaneously. The method also allows additional enhancement iterations resulting in better image reading and interpretation. In the case of digital mammography images, this technique allows suppression of background details and enhancement of selected features allowing additional diagnostic capability.

15 Claims, 3 Drawing Sheets

METHOD FOR OPTIMIZING VISUAL DISPLAY OF ENHANCED DIGITAL IMAGES

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention provides a method and system utilizing the wavelet transform as a method of improving and optimizing the visual display of image data at the time of viewing, to provide enhanced information analysis capability for disease screening and diagnosis, such as breast cancer. Through the use of an interactive software tool, the user can display both unprocessed and processed enhanced images simultaneously as well as control higher enhanced image iterations to produce better image viewing and therefore better diagnosing capability.

(2) Description of the Prior Art

The historical method of conducting mass screening for certain diseases, such as breast cancer, utilizes traditional analog film mammograms produced from x-rays. Once the mammograms are produced, the films are visually inspected by radiologists to determine if any abnormalities exist. Should a suspicious area be visually perceptible, various follow-on procedures are conducted. This process is subjective and dependent upon the level of expertise and thoroughness of the radiologist and the quality of detail of suspicious features in the film mammogram.

For example, the presence of dense breast tissue can mask subtle abnormal features in the mammogram. Cancer in the early stages may go undetected for some period of time. Detection of cancer during later stages of the disease results in more costly invasive procedures at best and may result in loss of life for severe cases.

With the recent advent of full-field, direct-digital mammography, digital acquisition technology that results in images most closely matching those of standard film screen radiography is becoming the standard method for screening. The advantage of digital mammography currently is that the image can be generated with confidence that technical features and factors will be satisfactory and the imaging will not need to be repeated, thus maximizing efficiency for the facility and minimizing x-ray dose exposure to the patient.

While such advantages are important, the opportunity exists for software tools which allow the radiologist to visually enhance features in digitally acquired images at the time of viewing to yield more information than was ever available with standard film screen radiography. With direct digital acquisition, additional benefits for image optimization can be realized through preprocessing and post-processing of image data. Rather than printing digital images onto film for interpretation by the radiologist, the same images can be available for viewing directly on a monitor.

Various wavelet techniques are used to enhance the visual and quantitative presentation of important image features. The use of wavelet transformation for image enhancement is known in the art of x-ray and ultrasonic imaging. Further the use of multiple image display capability is also known. However, the prior art does not demonstrate a unique system and method which allows a physician or other image reader to acquire raw, unprocessed data and interactively and iteratively perform image processing operations to enhance the image while maintaining the original unprocessed image for reference and comparison.

SUMMARY OF THE INVENTION

The present invention features an interactive method to detect, isolate, and visually enhance features in digital images.

The wavelet transform accepts all of or a specific portion of a digitized image, such as a mammogram, as the input image, and using multi-spectral decomposition, produces a mathematical model or algorithm representing the digital image across various frequencies and spatial positions represented by the transform. The resulting coefficient map is processed according to the selected enhancement method. One dimensional, two dimensional and three dimensional signal and image data may be enhanced, as well as segments of the image.

Once the coefficient map has been processed, an inverse transform is performed to reconstruct the image. The original unprocessed image and the enhanced image are displayed at the same time on the computer monitor. Since this is a variable process which is influenced by size and geometry of the features of interest and, in the case of a mammogram, density of breast tissue, the current process has the capability for three separate enhancement techniques as selected by the user.

The algorithms are parameterized and interactive such that several enhanced images may be produced in real time and the physician or the image reader may control tradeoffs among feature contrast enhancement, background tissue contrast reduction and spatial resolution. The system may also be adapted for use with or by an automated detection algorithm.

The present invention is of special utility in the location and enhancement of subtle abnormalities in breast images, to increase the contrast of the features of interest while simultaneously reducing the contrast of surrounding breast tissue. Suspicious features which would have remained hidden by conventional methods can be visualized in a manner that maintains the highest visual spatial resolution possible while still enhancing subtle features of interest to aid the radiologist to visually locate and interpret these suspicious features.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
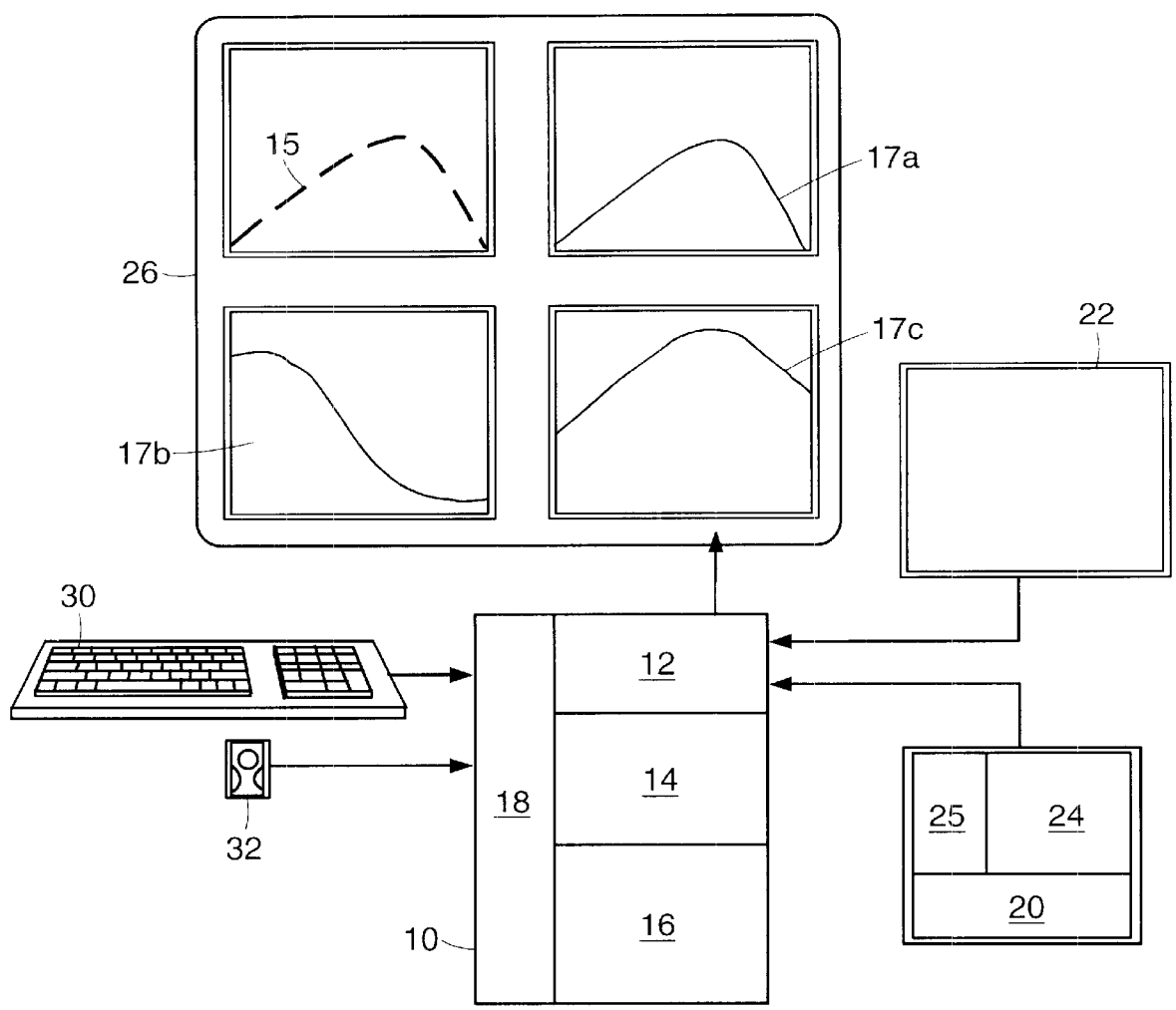
FIG. 1 is a system block diagram of the present invention.

The present invention comprises a method and system to detect, isolate, and visually enhance features in digital images. A data processing system 10, FIG. 1, such as a standalone workstation, personal computer (PC) or other processing system, is used to run the software system 12 which includes wavelet based software 14, enhancement routines 16 and a graphical user interface (GUI) 18 to guide the user through the received process. It is assumed that the image data 20 would be either received in digitized form or digitized external to the analysis system.

The raw image 15 is displayed proximate the processed, enhanced image(s) or image segment(s) 17a–17c on a monitor or other display device 26 connected to the data processing system 10. The user interfaces with the data processing system 10 through user interface devices, such as keyboard 30 and mouse 32.

Optional and external to this system could be a computer aided detection system 22 that automatically analyzes and highlights suspicious regions of either the raw or processed image for further inspection by the user, such as a radiologist, physician, or other image reader. Also external to this analysis system could optionally be a commercial storage device 24 containing a database 25 of digital images, such as mammograms, or other digitized images accessible via the Internet or local area network. Therefore, comparison with historical image data from previous years would be possible.

The analysis system of the present invention is driven by a graphical user interface (GUI) 18. The GUI allows the physician to select the enhancement method and processing tradeoffs, including the selection of either full image or image segments for further interactive wavelet enhancement. The GUI also incorporates zoom-in and zoom-out features for original and enhanced images as well as standard window and level image processing techniques. Higher detail iterative image segment analysis is possible for suspicious regions that are subtle in nature or for areas containing dense tissue where the features are difficult to visualize in either an original image or a baseline enhanced image.

The GUI allows the user to select the wavelet basis function(s), enhancement method and algorithm parameters constrained within an acceptable level. The GUI can have default settings which provide the user with initial images and predefined sets of settings facilitating enhancement selection.

The physician or user interactively controls the processing tradeoffs among contrast enhancement for features of interest, contrast reduction for surrounding tissue and spatial resolutions for clarity of detail in real time. This is a variable process which is influenced by size and geometry of the features of interest and, in the case of a mammogram, density of breast tissue. Because of this variability, the current process has the capability for multiple separate enhancement techniques as selected by the user and discussed below.

Figure 2:
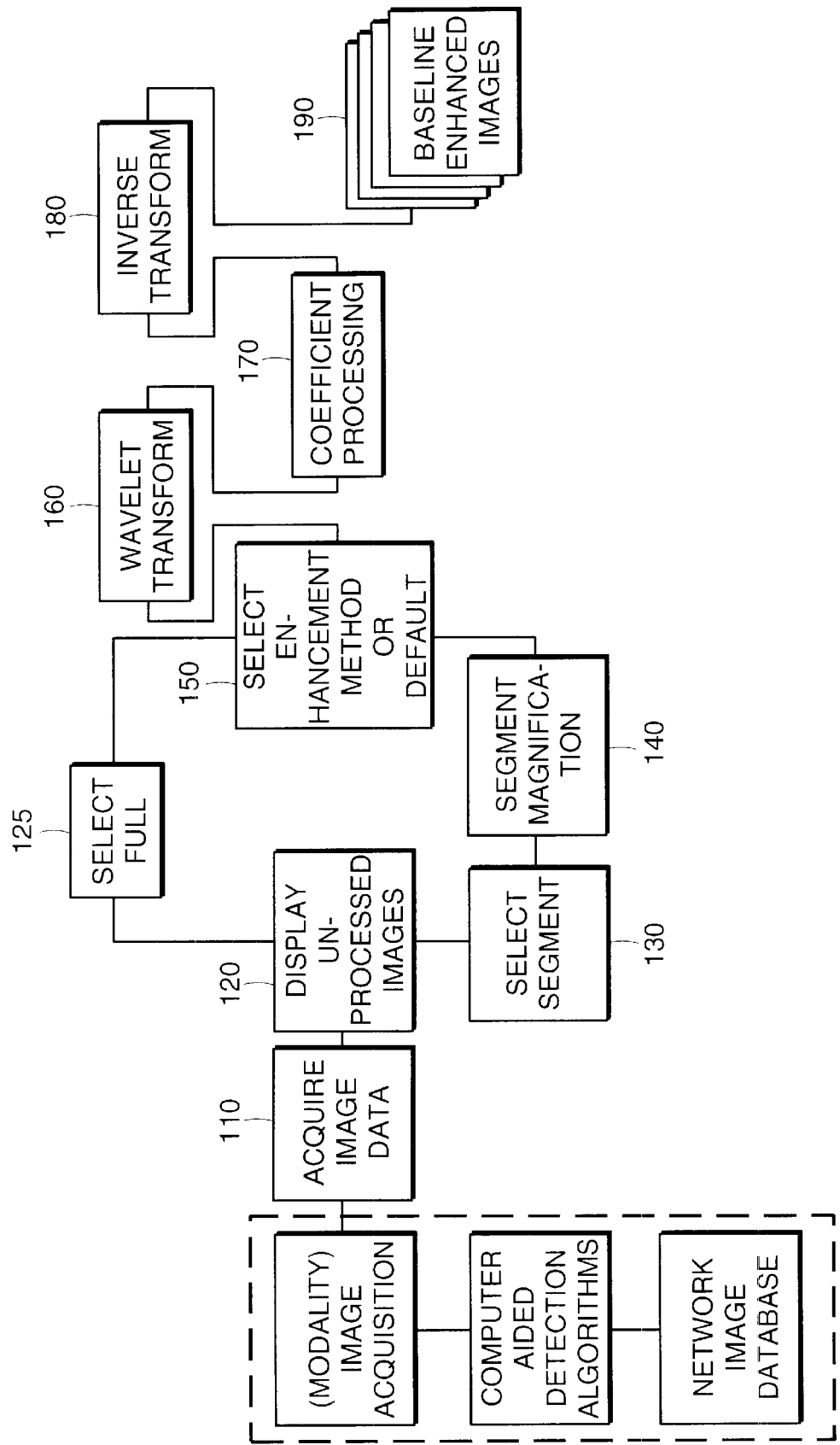
FIG. 2 is a flow chart of the method of the present invention.

FIG. 2 illustrates the method of the present invention. Image file identification data is entered by the user through the GUI 18 to acquire or retrieve the original series of images as indicated in act 110. The unprocessed image(s) is displayed on the computer monitor, act 120. The user selects the processing mode for either full image, act 125, or image segment, act 130. If image segment is selected, the user guides the process at act 140 and selects a specific area of interest in the raw image for further processing. A specific enhancement method may be selected or, by default, three separate enhancement techniques may be applied, act 150. The user may control the level of image enhancement and the specific technique utilized for enhancement, termed "Gentle", "Moderate", or "Aggressive". The selected enhancement is performed by the wavelet transform. A dyadic wavelet transform is performed on all the rows and columns of the image data, for a two dimensional example. For a general discussion of the use of wavelets, consult "Wavelets and Filter Banks" by Gilbert Strang and Truong Nguyen.

The transform first produces the multi-spectral image decomposition across the various frequencies and spatial positions represented by the transform at act 160. A specific wavelet basis function with various filter lengths may be selected by the user such as Daubechies, Coiflet, Symmlet, Harr, Morlet or the like. The system default utilizes the Daubechies basis function. The coefficient map is next processed at act 170 according to the selected enhancement method as further explained below under "Gentle Enhancement", "Moderate Enhancement", or "Aggressive Enhancement".

Once the coefficient map has been processed, an inverse wavelet transform is performed to reconstruct the image at act 180, now enhanced. The original unprocessed mammogram and several enhanced baseline full breast images or image segments are displayed simultaneously on the computer monitor at act 190.

The algorithms may be used with either digitized film mammograms or with digitally acquired data from next generation digital x-ray devices. The algorithms have been parameterized to allow the physician to interactively control the processing tradeoffs among contrast enhancement for features of interest, contrast reduction for surrounding tissue and spatial resolution for clarity of detail in real time.

The graphical user interface (GUI) provides the user with a series of interactive tools to iteratively select higher or lower levels of feature contrast enhancement and background tissue reduction. The interactive tools interface with the selected wavelet transform and enhancement function(s) to adjust in real-time the wavelet coefficients across multi-scale space. Each time the interactive tools are invoked, the wavelet coefficient space is adjusted to accomplish the stated goals above. The user controls the image enhancement according to whether or not the last iterative enhancement was visually better or worse than the previous enhanced image. Interactively controlling the level of image enhancement produces better visualization of certain types of features and tissue density.

The method of the present invention increases the signal to noise ratio (SNR) for the features of interest by both increasing the signal component and decreasing the noise component. Because the overall goal is to make suspicious features in digital images more visually apparent, these techniques increase the contrast for features of interest and reduce the contrast for surrounding tissue. In this respect, the ratio of signal (features of interest) to noise (surrounding tissue) is improved.

The algorithms also include quantitative techniques for calculating improvement factors (IFs). Coordinates are defined for features of interest and for background tissue in the raw unprocessed image. Average feature contrast to background tissue contrast ratios are calculated for both enhanced images (CBRe) and original images (CBRo). Improvement factors are defined as follows: IF=CBRe/CBRo.

The IF gain factor is similar to calculating a signal to noise ratio gain factor. Calculating IFs in this manner can aid in the testing of automated detection algorithms. This approach can function as a preprocessor for automated detection algorithms, since the approach improves the feature contrast to the background tissue contrast ratio, similar to boosting the signal to noise ratio in signal processing. Better detection of subtle microcalcifications and other lesions contained in dense breast tissue could result through the use of automated techniques, complementing visual inspection by physicians.

Figure 3:
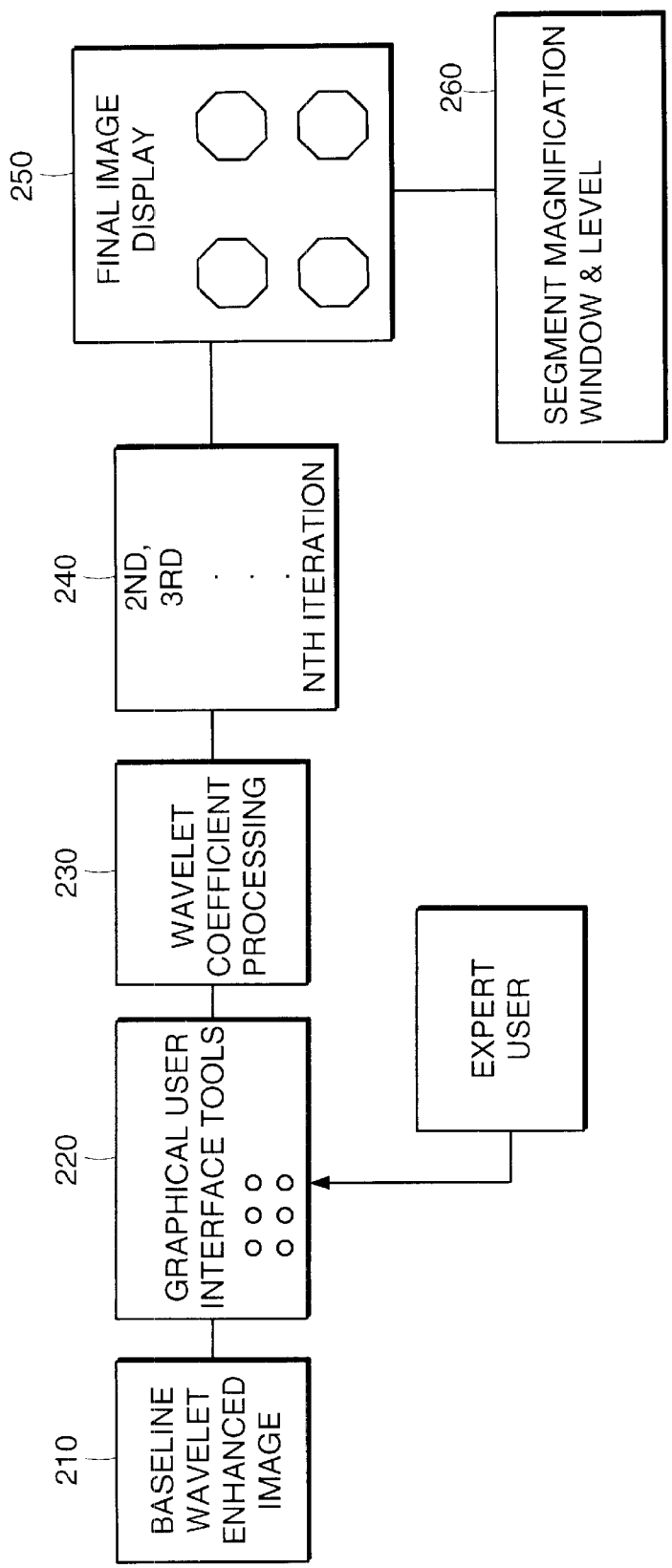
FIG. 3 illustrates an alternative embodiment for performing enhancement on an image segment or full digital mammogram.

The iterations of the wavelet transformation process of the present invention are illustrated in FIG. 3 and are similar, whether performing enhancement on an image segment or on the full digital image. In FIG. 3, the best baseline image from act 190 is selected as the baseline image in act 210. Through act 220, the physician selects the GUI tools and then further optimizes the best enhanced baseline image by directing and controlling multiscale wavelet space in act 230 to produce further enhanced iterations with respect to feature contrast enhancement, background tissue contrast reduction, and spatial resolution at act 240, through the GUI 18. The best possible image is displayed at act 250. In addition, conventional image processing capabilities, such as segment magnification and window and level processing may be utilized with the present invention as illustrated at act 260.

A two-dimensional dyadic wavelet transform is conducted on each row and each column of input image data. This produces a wavelet coefficient map that is essentially a matrix which illustrates how closely the wavelet function correlates with the image data across all frequencies and spatial positions represented by the transform. It is this coefficient matrix that is then processed as further described below to produce a processed enhanced image after inverse transformation.

In well known wavelet terminology, a received digital image is represented by multiple wavelet scales. Each scale represents a binary order of magnitude of number of pixels. For example, a 1024×1024 pixel image would have ten scales $-2^1, 2^2, \ldots, 2^{10}$. In the wavelet transform, scale is inversely related to frequency. For example, small scales are related to the highest frequencies while large scales are related to the lowest frequencies. A practitioner may be concerned with features that are best represented by certain scales but less obvious when viewing the original image. Accordingly it is often desirable to enhance features represented by certain scales while de-emphasizing image information represented in other scales.

A default generic scaling function is utilized by all three approaches for providing a gain to a wavelet coefficient matrix. Prior to invoking this function, the absolute value of the coefficient matrix is taken such that only the magnitude of the coefficients is passed to this function independent of the sign of the coefficients. The signs of the elements will be preserved in later calculations.

The scaling function receives the wavelet coefficients from the selected enhancement method (gentle, moderate, or aggressive) and maximum and minimum gain factors, $G_{max}$ and $G_{min}$, provided either initially by the system or interactively from the GUI. The maximum and minimum wavelet coefficients, $W_{max}$ and $W_{min}$, are obtained from the coefficient matrix. The ratio M is defined as follows:

$$M = \frac{G_{max} - G_{min}}{W_{max} - W_{min}} \quad (1)$$

The scaling function is provided as follows:

$$[Y] = M*([X] - W_{min}) + G_{min} \quad (2)$$

where X is the absolute value of the wavelet coefficient matrix which may be either the entire matrix across all scales and spatial positions or a partial coefficient matrix which only represents specific scales and spatial positions depending on the technique invoked;

$G_{max}$ is the upper boundary of the range of the gain factors to be applied to the wavelet coefficient matrix;

$G_{min}$ is the lower boundary of the range of the gain factors to be applied to the wavelet coefficient matrix;

$W_{max}$ is the maximum magnitude of the wavelet coefficient matrix; and $W_{min}$ is the minimum magnitude of the wavelet coefficient matrix.

Y represents a scaled coefficient matrix, ranging between the upper boundary value of $G_{max}$ and the lower boundary value of $G_{min}$.

While the scaling function above is preferred, the system may also utilize other functions to modify wavelet coefficients which include but are not limited to piecewise linear functions, square functions and cubic functions. For example, the piecewise linear function is the implementation of three linear functions for a user selected threshold and for a specified wavelet matrix. If the wavelet coefficient is greater than the threshold, the first linear function is implemented. If the wavelet coefficient is less than the threshold, the second linear function is implemented. If the absolute value of the wavelet coefficient is less than the threshold, the third linear function is implemented. The user controls the slope of the linear function by passing parameters to the function.

As a second example, the square function takes the wavelet coefficient as the input and squares the coefficient as the output while preserving the sign of the coefficient. The cubic function simply takes the wavelet coefficient as the input and cubes the coefficient as the output.

The overall goal of the following techniques is to improve the detection of breast cancer whether the approach is visually inspecting an enhanced image or utilizing an automated detection algorithm to highlight a suspicious region of an image. The techniques concern three main functions: enhancement of features of interest such as clustered calcifications, contrast reduction of surrounding tissue, especially dense tissue, and maintenance of high spatial resolution for diagnostic quality. These functions may be addressed either simultaneously or individually. For example, an image produced from fatty breast tissue that is already very clear could require only enhancement of an extremely subtle calcification that is not visually perceptible, rather than reduction of contrast on uninteresting background tissue.

Gentle Enhancement

In the gentle enhancement method, single scales or frequencies of the wavelet transform are processed. The GUI allows the user to select a single scale of the wavelet transform that the user believes will map well with the size and shape of the particular feature of interest.

Two closely related wavelet basis functions are selected for representing the features of interest at a corresponding scale. These wavelet basis functions have the same parent function but different filter lengths. Previous work has shown the benefit of using two closely related wavelet basis functions for improving image enhancement using the ("gentle" and "moderate") techniques.

Two separate sets of gain factors are used to calculate two separate gain factor matrices using the scaling function. The first set of gain factors enhances desirable details in the image. This set of gain factors is larger in magnitude and is used to modify the higher frequency coefficients at a given scale. The second set of gain factors de-emphasizes background details in the image. This set is more modest in magnitude and is used to modify the wavelet coefficients corresponding to the lowest frequencies in the coefficient matrix at a given scale. These sets of gain factors are empirically defined and specific to a particular application. For example, digital mammography would have a different set of gain factors than would digital chest x-rays or bone and joint analysis. The transform coefficients from the first wavelet basis function are used for separate calculation of two gain factor matrices. The first transform wavelet coefficients corresponding to the highest frequencies of the decomposition based on the chosen scale of the wavelet basis function are used to calculate the first gain factor matrix as previously described.

The first transform wavelet coefficients corresponding to the lowest frequencies of the decomposition based on the chosen scale of the wavelet basis function are used to calculate the second gain factor matrix as previously described. These coefficients are excessively larger than the coefficients corresponding to higher frequencies, and if left in the calculation of the gain factor matrix for single scale resolution, the data would be badly skewed towards the few large coefficients of the lowest frequency.

The second wavelet transform coefficient matrix from the second basis function is modified by the two gain factor matrices. The modification of the wavelet space occurs as an element by element matrix multiplication of the wavelet coefficient matrix from the second transform with the two calculated gain factor matrices from the first transform.

The gain factor matrix calculated with the lower magnitude gain factors modifies the lower frequency coefficients. The gain factor matrix calculated with the higher magnitude gain factors modifies the remaining coefficients. The inverse wavelet transform is performed on this modified coefficient matrix from the second basis function to produce an enhanced image.

For the gain factors for the lowest frequencies in this technique, $G_{max}$ has varied between 0.9 and 1.2 and $G_{min}$ has varied from 0.9 to 1.0. For the set of gain factors for the highest frequencies in this technique, $G_{max}$ has varied between 1.0 to 8.0 and $G_{min}$ has varied from 0.5 to 1.0. These factors have been found to enhance the image while maintaining good spatial quality.

Moderate Enhancement

Moderate enhancement relies on a multi-step process for conducting image enhancement. Generally, this is similar to the gentle enhancement technique except a range of feature characteristics is specified, and this range of feature characteristics involves multiple scales of the wavelet transform. After transforming, resealing is utilized to take full advantage of the entire dynamic range of the color map.

The user selects the specific features of interest and resolutions desired for image enhancement. Scales of the wavelet transform are selected that map well with the features of interest. These features may span a range of size and shape characteristics. As discussed above, two wavelet basis functions are provided and gain factor matrices are calculated for each scale. Transformation, enhancement, and inverse transformation is performed as above for each scale.

The resealing function works best when the image segment to be enhanced is fairly homogeneous in structure, i.e. the data exists in a narrow band of the entire dynamic range for the image. In that case it is beneficial to rescale the image data. For example, if an image segment is selected for magnification and has a dynamic range between 124 and 182 out of 256 grayscale, there would be a visual benefit to resealing the data to take advantage of stretching the segment dynamic range over the entire 256 grayscale.

If the image segment to be enhanced already significantly represents the dynamic range of the color map, this technique would utilize enhancement from two or three frequency/spatial resolutions and not attempt to rescale the image data. For the set of gain factors for the lowest frequencies in this technique $G_{max}$ has varied between 0.7 to 1.6 and $G_{min}$ has varied from 0.5 to 1. For the set of gain factors for the highest frequencies in this technique, $G_{max}$ has varied between 1.0 to 12 and $G_{min}$ has varied from 0.5 to 1. In all other respects, the specific technique followed for image enhancement is the same as the approach discussed above for gentle enhancement except for the fact that more than one scale of the wavelet transform is being utilized.

Aggressive Enhancement

Unlike the previous techniques, the aggressive enhancement utilizes a single wavelet transform from a single basis function for both the calculation of the gain factor matrix and the processing of the wavelet coefficient matrix. This technique utilizes the entire frequency/spatial decomposition as produced by the dyadic wavelet transform for image enhancement. The gain factors are passed to the scaling function as the default or to piece-wise linear, square or cubic functions for each unique frequency/spatial resolution of the wavelet transform.

Given that the present invention is conducting a two-dimensional wavelet transform on the image data, the number of unique frequency/spatial resolution cells is determined by the size of the input image data. The wavelet transform is conducted on all of the rows and all of the columns of the input image data. What may be varied with this technique is the choice of the wavelet basis function and the gain factors passed to the scaling function or other selected enhancement function for each scale. For example, if $G_{max}$ and $G_{min}$ are both passed the values of 1, there is no modification in the wavelet coefficient for that particular frequency/spatial resolution.

A unique gain factor matrix is calculated for each individual scale. This gain factor matrix is then used to perform an element by element matrix multiplication with the original wavelet matrix for that specific resolution to create a new modified wavelet matrix. When the process is completed for all scales, an inverse wavelet transform is performed, and an enhanced image is produced. Because this technique utilizes all scales of the transform, it requires significantly more computations than the other techniques.

There are some general rules defined by heuristic measures that are followed in the selection of the magnitude of the gain factors for all three methods of wavelet enhancement.

First, since it is not known apriori the exact size of the features to be enhanced and in which directions the features are more prominent, i.e., the horizontal or vertical direction, consistency is kept in the selection of the gain factors for related frequency/spatial resolutions. For example, gain factors used for a level 3 scale in the horizontal direction and a level 4 scale in the vertical direction would be similar to gain factors used for a level 4 scale in the horizontal direction and a level 3 scale in the vertical direction.

Secondly, since the lowest frequency resolutions contain the highest percentage of image energy, the magnitude of the gain factors for the low frequency scale are significantly smaller than the magnitude of the gain factors for the high frequency scales.

Thirdly, the type of tissue structure encountered will effect the level of the gain factors selected. For extremely dense breast tissue, it is at least equally important to reduce the contrast of the surrounding breast tissue as it is to increase the contrast of features of interest. It is not uncommon for both $G_{max}$ and $G_{min}$ to have values less than 1 for low frequency resolutions for dense breast tissue. For fatty tissue structure, $G_{max}$ may vary from slightly greater than 1 to slightly less than 1 and $G_{min}$ may vary from 0 to 1 for low frequency resolutions. For fatty-glandular tissue structure, the values of the parameters fall in between the range of those mentioned above for low frequency resolutions for this technique depending on whether the tissue structure has a higher percentage of fatty or glandular tissue density.

Fourthly, for higher frequency resolutions, $G_{max}$ may vary between 1.0 and 40.0 and $G_{min}$ may vary between 0 and 1.0.

Although the present invention is described with regard to an embodiment that relates to the use of the present invention in the area of mammography, this is for exemplary purposes only. The process of real time interactive visual enhancement is relevant for all digital images independent of modality and method of acquisition. The present invention could be utilized in other applications in digital radiography as well, but is not limited to, for example, x-ray examinations for chest, abdomen, extremities, bone and joint, and general cancer x-ray examinations for lung, prostate, and brain. The present invention could also be utilized in other modalities, for example, ultrasound, Magnetic Resonance Imaging (MRI), Computer Tomography (CT), and nuclear radiology including single photon emission tomography (SPECT) and positron emission tomography (PET). The present invention would have application in digital angiography, with or without subtraction, and in digital techniques such as tomosynthesis and dual kilovolt (kv) subtraction. Non-medical applications include, for example, x-ray analysis for security applications including baggage and cargo protection, manufacturing fault detection analysis, inspection of electronic circuit boards, and enhancement of satellite imagery.

In addressing workflow issues, system default selections may be established by a specific physician based upon individual desires such that baseline enhanced images are preprocessed and available for review at the time of viewing for full digital images. Additional image enhancement iterations may then be produced in real time should a suspicious region require further enhancement.

Should these techniques be utilized as an adjunct to computer aided detection (CAD) algorithms, baseline enhanced image segments may be produced and displayed at the time of viewing. Multiple baseline enhanced image segments, each segment produced for an individual CAD marked segment, would provide the physician with a tool to visually inspect areas of the image thought to be suspicious by the CAD algorithm. These enhanced image segments would be available at the time of viewing. Similarly for this process, the physician may desire to produce additional enhanced image iterations for increased visual diagnosis.

Various presets may be established to conduct specific and focused screening and diagnosis for a particular feature type. For example, a physician may select a preset where the technique is optimized to conduct image enhancement for only calcifications or only spiculated lesions. As previously described, additional iterative image enhancements may be conducted.

In light of the above, it is therefore understood that within the scope of the appended claims, the invention may be practiced otherwise than as specifically described.

What is claimed is:

1. An interactive method to detect, isolate, and visually enhance features in a received digital image comprising the following steps:

establishing enhancement parameters governing gain factors, wavelet basis functions, transformation techniques, and enhancement routines;

establishing at least one range of feature characteristics for enhancement;

selecting a wavelet basis function based upon said established range;

selecting gain factors based on said established range;

transforming at least a portion of said received digital image into the wavelet domain utilizing said selected basis function to obtain transform coefficients;

enhancing said established range of feature characteristics using said transform coefficients and said selected gain factors to provide enhanced transform coefficients; and inversely transforming said enhanced transform coefficients giving an enhanced image.

2. The method of claim 1 further comprising the step of displaying the enhanced image on a display device proximate said received digitized image.

3. The method of claim 1 further comprising the steps of:

pre-screening said received digital image by an automated detection algorithm; and indicating areas of interest in said received digital image.

4. The method of claim 1 wherein said step of establishing at least one range of feature characteristics comprises selecting one group of predefined feature characteristics from multiple groups of predefined feature characteristics.

5. The method of claim 1 further comprising the step of screening said received digitized image data by an automated detection algorithm after said step of inversely transforming.

6. The method of claim 1 further comprising the step of conventionally processing said enhanced image prior to the step of displaying.

7. The method of claim 6 wherein said step of conventionally processing is performed by a technique selected from the group consisting of segment magnifying, window and level processing and histogram equalization.

8. The method of claim 1 wherein said step of selecting a wavelet bases function comprises utilizing a basis function selected from the group consisting of a Daubechies function, a Coiflet function, a Symmlet function, a Morlet function and a Harr function.

9. An interactive method to detect, isolate, and visually enhance features in a received digital image comprising the following steps:

establishing at least one range of feature characteristics for enhancement;

selecting a wavelet basis function based upon said established range;

selecting gain factors based on said established range;

transforming at least a portion of said received digital image into the wavelet domain utilizing said selected basis function to obtain transform coefficients;

enhancing said established range of feature characteristics using said transform coefficients and said selected gain factors to provide enhanced transform coefficients; and inversely transforming said enhanced transform coefficients giving an enhanced image;

wherein:

said step of establishing at least one range comprises establishing exactly one range of feature characteristics for enhancement, said range of feature characteristics associated with a single scale;

said step of selecting a wavelet basis function comprises selecting a first basis function and a closely related second basis function based upon said established range of feature characteristics;

said step of selecting gain factors comprises:
  selecting a feature detail range of gain factors for said scale; and
  selecting a background image range of gain factors for the background details of the digital image for said scale;

said step of transforming at least a portion of said received digital image comprises:
  transforming at least a portion of said digitized image into the wavelet domain utilizing said first basis function to obtain first transform coefficients; and
  transforming at least a portion of said digitized image into the wavelet domain utilizing said second basis function to obtain second transform coefficients;

said step of enhancing said established range of feature characteristics comprises:
  calculating a feature detail gain factor matrix by applying said selected feature detail range of gain factors to said first transform coefficients;
  calculating a background image gain factor matrix by applying said background image range of gain factors to said first transform coefficients; and
  multiplying said feature detail and background image gain factor matrices with said second transform coefficients to obtain enhanced transform coefficients.

10. An interactive method to detect, isolate, and visually enhance features in a received digital image comprising the following steps:

establishing at least one range of feature characteristics for enhancement;

selecting a wavelet basis function based upon said established range;

selecting gain factors based on said established range;

transforming at least a portion of said received digital image into the wavelet domain utilizing said selected basis function to obtain transform coefficients;

enhancing said established range of feature characteristics using said transform coefficients and said selected gain factors to provide enhanced transform coefficients; and inversely transforming said enhanced transform coefficients giving an enhanced image;

wherein:

said step of establishing at least one range comprises establishing a range of feature characteristics associated with multiple scales;

said step of selecting a wavelet basis function comprises selecting a first basis function and a closely related second basis function based upon said established feature characteristics;

said step of selecting gain factors comprises:
  selecting a feature detail range of gain factors for said multiple scales; and
  selecting a background image range of gain factors for the background details of the digital image for said multiple scales;

said step of transforming at least a portion of said received digital image comprises:
  transforming at least a portion of said digitized image into the wavelet domain utilizing said first basis function to obtain first transform coefficients; and
  transforming at least a portion of said digitized image into the wavelet domain utilizing said second basis function to obtain second transform coefficients;

said step of enhancing said established range of feature characteristics comprises:
  calculating multiple feature detail gain factor matrices, each feature detail gain factor matrix being associated with one scale, each said feature detail gain factor matrix being calculated by applying one feature detail range of selected gain factors to said first transform coefficients;
  calculating a background image gain factor matrix by applying said background image range of gain factors to said first transform coefficients; and
  multiplying said feature detail and background image gain factor matrices with said second transform coefficients to obtain enhanced transform coefficients.

11. An interactive method to detect, isolate, and visually enhance features in a received digital image comprising the following steps:

establishing at least one range of feature characteristics for enhancement;

selecting a wavelet basis function based upon said established range;

selecting gain factors based on said established range;

transforming at least a portion of said received digital image into the wavelet domain utilizing said selected basis function to obtain transform coefficients;

enhancing said established range of feature characteristics using said transform coefficients and said selected gain factors to provide enhanced transform coefficients; and inversely transforming said enhanced transform coefficients giving an enhanced image;

wherein:

said step of selecting a range of gain factors comprises selecting a range of gain factors for said established ranges of feature characteristics, said gain factors being associated with scales of interest and background scales;

said step of transforming at least a portion of said digitized image comprises transforming into the wavelet domain utilizing said basis function to obtain transform coefficients over all scales representing the full image resolution;

said step of enhancing comprises:
  calculating a gain factor matrix for each scale by applying said selected gain factors to said transform coefficients; and
  multiplying said gain factor matrices with said transform coefficients to obtain enhanced transform coefficients.

12. An interactive method to detect, isolate, and visually enhance features in a received digital image comprising the following steps:

establishing at least one range of feature characteristics for enhancement;

selecting a wavelet basis function based upon said established range;

selecting gain factors based on said established range;

transforming at least a portion of said received digital image into the wavelet domain utilizing said selected basis function to obtain transform coefficients;

enhancing said established range of feature characteristics using said transform coefficients and said selected gain factors to provide enhanced transform coefficients;

inversely transforming said enhanced transform coefficients giving an enhanced image;

displaying the enhanced image on a display device proximate said received digitized image; and repeating the steps of establishing at least one range of features, selecting a wavelet basis function, selecting gain factors, transforming at least a portion, enhancing said established range, and inversely transforming said enhanced transform coefficients after said step of displaying.

13. The method of claim 12 wherein said step of repeating is performed for enhancing the visibility of said feature characteristics for enhancement and for reducing the visibility of features other than said feature characteristics for enhancement.

14. An interactive method to detect, isolate, and visually enhance features in a received digital image comprising the following steps:

establishing at least one range of feature characteristics for enhancement;

selecting a wavelet basis function based upon said established range;

selecting gain factors based on said established range;

transforming at least a portion of said received digital image into the wavelet domain utilizing said selected basis function to obtain transform coefficients;

enhancing said established range of feature characteristics using said transform coefficients and said selected gain factors to provide enhanced transform coefficients;

inversely transforming said enhanced transform coefficients giving an enhanced image;

pre-screening said received digital image by an automated detection algorithm; and indicating areas of interest in said received digital image;

wherein:

said steps of establishing at least one range of features, selecting a wavelet basis function, selecting gain factors, transforming at least a portion, enhancing said established range, and inversely transforming said enhanced transform coefficients are performed on said indicated areas of interest; and said method further comprising the step of displaying the enhanced image for the indicated area of interest.

15. An interactive method to detect, isolate, and visually enhance features in a received digital image comprising the following steps:

establishing at least one range of feature characteristics for enhancement;

selecting a wavelet basis function based upon said established range;

selecting gain factors based on said established range;

transforming at least a portion of said received digital image into the wavelet domain utilizing said selected basis function to obtain transform coefficients;

enhancing said established range of feature characteristics using said transform coefficients and said selected gain factors to provide enhanced transform coefficients;

inversely transforming said enhanced transform coefficients giving an enhanced image;

pre-screening said received digital image by an automated detection algorithm; and indicating areas of interest in said received digital image;

wherein:

said steps of establishing at least one range of features, selecting a wavelet basis function, selecting gain factors, transforming at least a portion, enhancing said established range, and inversely transforming said enhanced transform coefficients are performed on said indicated areas of interest; and said method further comprising the step of displaying the enhanced image for the indicated area of interest proximate the portion of the received digital image showing the indicated area of interest.

* * * * *